United States Patent [19]

Morioka et al.

[11] Patent Number: 4,895,580

[45] Date of Patent: Jan. 23, 1990

[54] GAS TREATING APPARATUS

[75] Inventors: Koji Morioka; Hiromasa Ogata; Susumu Ohmori, all of Tokyo, Japan

[73] Assignee: Toya Boseki Kabushiki Kaisha Tajkisha Ltd, Tokyo, Japan

[21] Appl. No.: 314,641

[22] Filed: Feb. 23, 1989

[30] Foreign Application Priority Data

Sep. 26, 1988 [JP] Japan .................. 63-240096

[51] Int. Cl.⁴ .............................................. B01D 53/06
[52] U.S. Cl. ........................................ 55/160; 55/181; 55/274; 55/390
[58] Field of Search .................... 55/34, 60, 61, 77–79, 55/160, 161, 181, 274, 390

[56] References Cited

U.S. PATENT DOCUMENTS

| | | | |
|---|---|---|---|
| 2,639,000 | 5/1953 | Edwards | 55/390 X |
| 3,252,273 | 5/1966 | Stephens | 55/390 X |
| 3,611,337 | 10/1971 | Balzer et al. | 55/274 X |
| 3,703,192 | 11/1972 | Staudacher et al. | 55/274 X |
| 4,023,939 | 5/1977 | Jüntgen et al. | 55/181 X |
| 4,259,094 | 3/1981 | Nagai et al. | 55/181 |
| 4,292,054 | 9/1981 | Noack et al. | 55/181 |
| 4,490,161 | 12/1984 | Ito et al. | 55/390 X |
| 4,589,892 | 5/1986 | Leonard | 55/390 X |
| 4,711,765 | 12/1987 | Cates et al. | 55/390 X |

FOREIGN PATENT DOCUMENTS 55-051418 4/1980 Japan ..................... 55/390

Primary Examiner—Robert Spitzer
Attorney, Agent, or Firm—Webb, Burden, Ziesenheim & Webb

[57] ABSTRACT

A gas treating apparatus for removing solvent from a treatment-object gas. The apparatus has an adsorbing member formed mainly of activated carbon capable of adsorbing the solvent. The adsorbed solvent trapped on the adsorbing member is desorbed therefrom when the member is moved by a conveying device to a desorbing section where a high-temperature recycling air is supplied. When a functional trouble occurs with the apparatus, the adsorbing member currently located adjacent the desorbing section is effectively evacuated from a high-temperature-zero-air-flow condition thereby avoiding an abnormal temperature rise and a successive fire accident apt to occur in the desorbing section vicinity due to an oxidation reaction of the adsorbed solvent. Consequently, the invention provides the apparatus with superior safety.

12 Claims, 5 Drawing Sheets

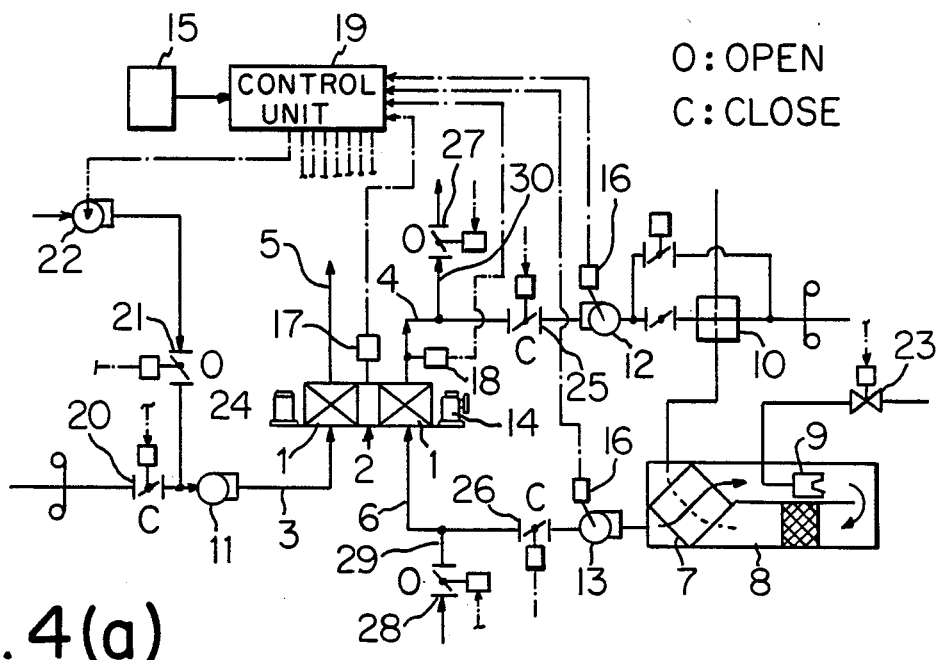

Fig. 4(a)

(ELECTRICITY FAILURE)

Fig. 4(b)

| | | TROUBLE | PREDETERMINED TIME PERIOD |
|---|---|---|---|
| ABSORBING FAN 11 | DRIVE | →STOP | |
| DESORBING FAN 12 | DRIVE | →STOP | |
| DESORBING FAN 13 | DRIVE | →STOP | |
| EMERGENCY FAN 22 | STOP | ------DRIVE------ | →STOP |
| CUT-OFF VALVE 23 | OPEN | →CLOSE | |
| ROTOR 2(14) | DRIVE | →STOP | |
| COMPRESSION -AIR MOTOR 24 | STOP | ------DRIVE------ | |
| FIRST DAMPER 20 | OPEN | →CLOSE | |
| SECOND DAMPER 21 | CLOSE | ------OPEN------ | |
| THIRD DAMPER 25 | OPEN | →CLOSE | |
| FOURTH DAMPER 26 | OPEN | →CLOSE | |
| FIFTH DAMPER 27 | CLOSE | ------OPEN------ | |
| SIXTH DAMPER 28 | CLOSE | ------OPEN------ | |

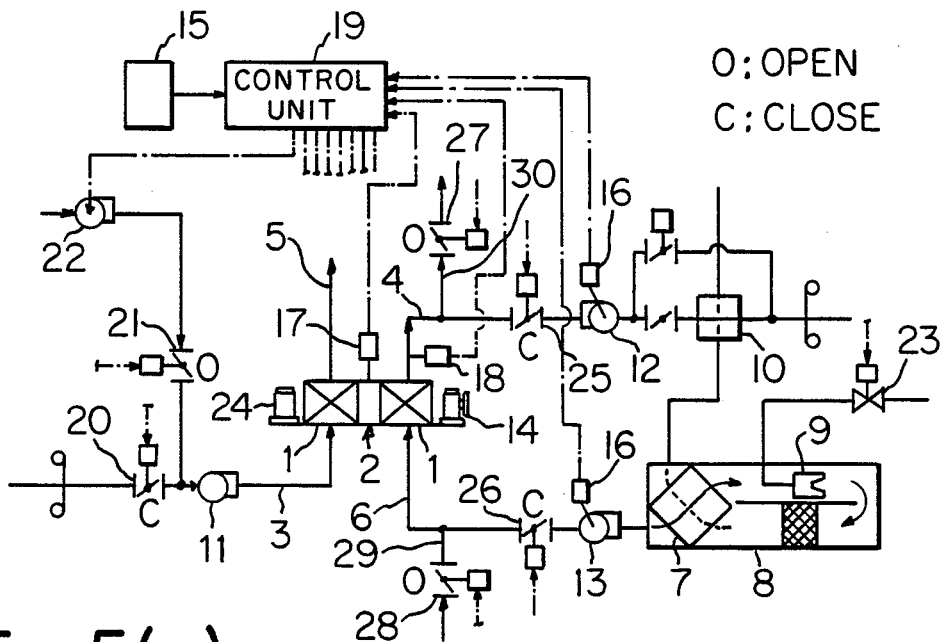

Fig. 5(a)

(DESORBING FAN 12, 13 ABNORMAL STOP)

| | | TROUBLE | PREDETERMINED TIME PERIOD |
|---|---|---|---|
| ABSORBING FAN 11 | DRIVE | | →STOP-------- |
| DESORBING FAN 12 | DRIVE | →STOP--------------- | |
| DESORBING FAN 13 | DRIVE | →STOP--------------- | |
| EMERGENCY FAN 22 | STOP | ------------------- | |
| CUT-OFF VALVE 23 | OPEN | →CLOSE-------------- | |
| ROTOR 2(14) | DRIVE | →STOP--------------- | |
| COMPRESSION-AIR MOTOR 24 | STOP | ------DRIVE-------- | |
| FIRST DAMPER 20 | OPEN | →CLOSE-------------- | |
| SECOND DAMPER 21 | CLOSE | ------OPEN--------- | |
| THIRD DAMPER 25 | OPEN | →CLOSE-------------- | |
| FOURTH DAMPER 26 | OPEN | →CLOSE-------------- | |
| FIFTH DAMPER 27 | CLOSE | ------OPEN--------- | |
| SIXTH DAMPER 28 | CLOSE | ------OPEN--------- | |

Fig. 5(b)

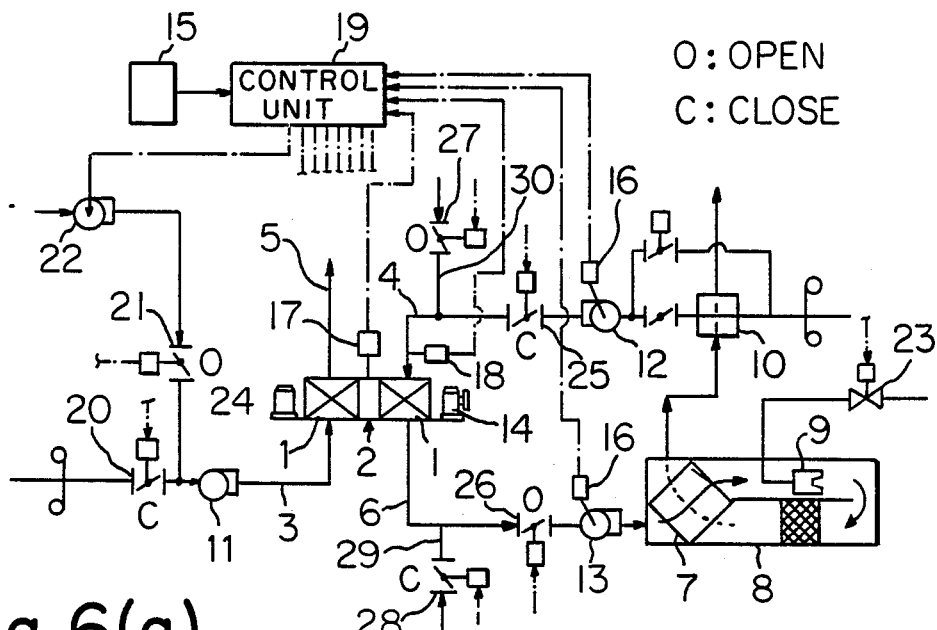

O : OPEN
C : CLOSE

Fig. 6(a)
(ROTOR ABNORMAL STOP)

| | | TROUBLE | PREDETERMINED TIME PERIOD |
|---|---|---|---|
| ABSORBING FAN 11 | DRIVE | | →STOP |
| DESORBING FAN 12 | DRIVE | →STOP | |
| DESORBING FAN 13 | DRIVE | | →STOP |
| EMERGENCY FAN 22 | STOP | | |
| CUT-OFF VALVE 23 | OPEN | →CLOSE | |
| ROTOR 2(14) | DRIVE | →STOP | |
| COMPRESSION-AIR MOTOR 24 | STOP | | DRIVE |
| FIRST DAMPER 20 | OPEN | →CLOSE | |
| SECOND DAMPER 21 | CLOSE | | OPEN |
| THIRD DAMPER 25 | OPEN | →CLOSE | |
| FOURTH DAMPER 26 | OPEN | | |
| FIFTH DAMPER 27 | CLOSE | | OPEN |
| SIXTH DAMPER 28 | CLOSE | | |

GAS TREATING APPARATUS

BACKGROUND OF THE INVENTION

1. Field of the Invention

The present invention relates to a gas treating apparatus for removing a solvent from a treatment-object gas containing the solvent, and more particularly to a gas treating apparatus of the above-noted type comprising: an adsorptive member having a material capable of adsorbing the solvent contained in the object gas and capable also of desorbing the adsorbed solvent through a high-temperature recycling air; a conveying device for holding the adsorptive member and conveying the same from an adsorbing section where the treatment-object gas is introduced to a desorbing section; and a recycling gas supplying device for supplying the high-temperature recycling air for solvent desorption to the adsorptive member positioned in the desorbing section.

2. Description of the Prior Art

With a conventional gas treating apparatus of the above-described type, if such troubles occur as to accidentally stop the recycling air supplying device or the conveyor device, this may lead to a dangerous fire due to an abnormal temperature rise in and consequently a spontaneous combustion of the adsorptive member. More specifically, if the adsorptive member contains e.g. activated carbon, adsorbed but yet undesorbed solvent such as ketone causes an oxidation reaction on the adsorptive member located in the vicinity of the desorbing section and heated to a high temperature by the recycling air. Then, with gradual accumulation of this reaction heat, there occurs such an abnormal temperature rise in the adsorptive member, which temperature rise eventually results in the spontaneous combustion of the same. The conventional gas treating apparatuses of this kind have thus far failed to provide any effective safety means capable of precluding occurrence of such abnormal temperature rise.

SUMMARY OF THE INVENTION

The primary object of the present invention is to provide an improved gas treating apparatus with safety means capable of preventing an abnormal temperature rise in the adsorptive member associated with the above-noted troubles.

In order to accomplish the above object, the present inventors conducted many various experiments and found out that such an abnormal temperature rise in the adsorptive member tends to occur at the recycling air temperature if there exists only a negligible amount of air flow (this condition will be referred to as 'zero-air-flow condition' hereinafter) and further that the abnormal temperature rise in the case of apparatus trouble is most likely at a portion of the adsorptive member currently positioned adjacent the desorbing section or at its vicinity (this portion will be referred to as 'spontaneously-combustible portion' hereinafter).

With these observations taken into consideration, according to a first characterizing feature of the invention, the gas treating apparatus comprises: trouble detecting means for detecting an abnormality in the gas treating apparatus; and safety means for evacuating the spontaneously-combustible portion from a high-temperature-zero-air-flow condition based on a detection of the detecting means.

This first feature improves the safety of the adsorptive member against an abnormal temperature rise and consequently the safety of a gas treating apparatus against fire accidents associated with the abnormal temperature rise.

According to a second characterizing feature of the present invention, the safety means includes:

an emergency evacuation device for evacuating the spontaneously-combustible portion at the desorbing section by activating the conveying device at a speed faster than a normal conveying speed, and/or a second cooling air supply device for supplying a second cooling air to the desorbing section.

This is to say, if the emergency evacuation device is activated, the spontaneously-combustible portion currently placed under the 'high-temperature-zero-air-flow condition' is evacuated to the adsorbing section under a relatively lower temperature. On the other hand, if the second cooling air supply device is activated, the same portion is supplied with the second cooling air.

Either of the above devices alone may be employed. It is to be noted, however, that these devices when used together will further improve the safety of the adsorptive member against abnormal temperature rise.

Other objects, features and effects of the invention will become apparent from the following more detailed description of the preferred embodiments with reference to the accompanying drawings.

BRIEF DESCRIPTION OF THE DRAWINGS

Accompanying drawings FIGS. 1 through 6 illustrate preferred embodiments of a gas treating apparatus related to the present invention, in which;

FIG. 1 is a vertical section of a rotor,

FIG. 2 is a plan view of the rotor,

FIG. 3 is a view showing an entire construction of the gas treating apparatus under a normal operating condition, FIGS. 4(a) and 4(b) through 6(a) and 6(b) are construction views and operation tables of the apparatus particularly illustrating various operating conditions of safety means, respectively.

DESCRIPTION OF THE PREFERRED EMBODIMENTS

Figure 1:
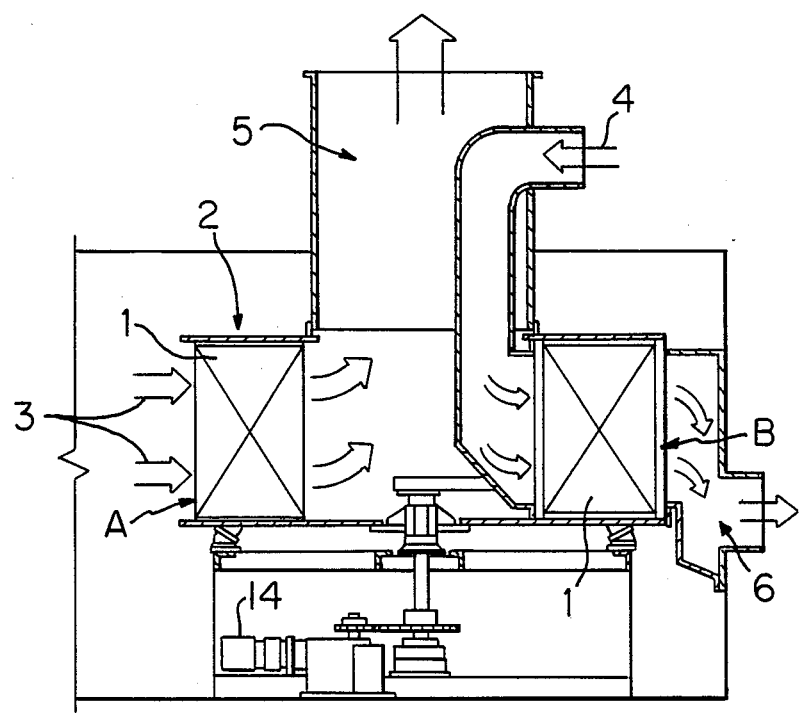
Figure 2:
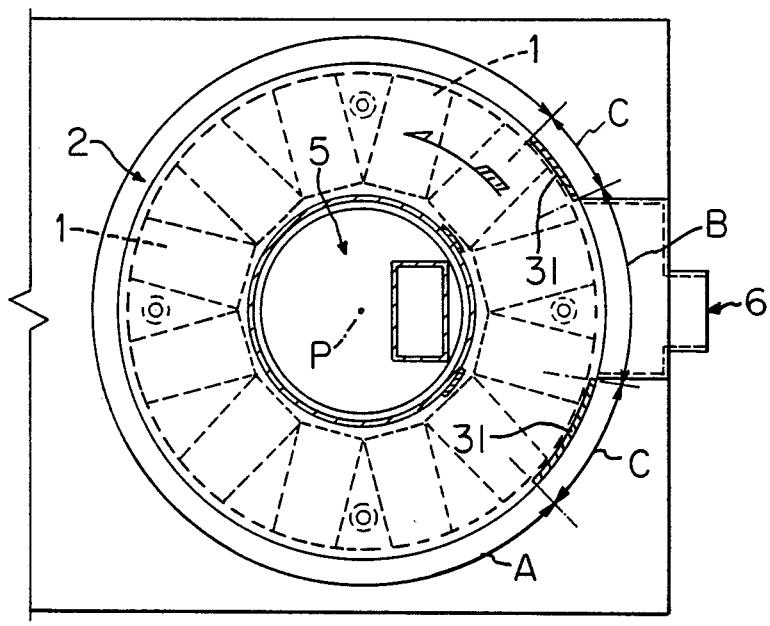

As shown in FIGS. 1 and 2, a plurality of adsorptive members 1 for adsorbing solvent contained in a treatment-object gas are mounted on a rotor 2 about its rotational axis P in a radial arrangement. Within a rotational range of the rotor 2, a rotor portion positioned in a predetermined rotational phase comprises an adsorbing section A while another rotor portion positioned in a different rotational phase comprises a desorbing section B.

At the adsorbing section A, the solvent in the treatment-object gas is adsorbed to the adsorptive members 1 as the gas introduced through a gas passage 3 to an outer peripheral portion of the rotor 2 passes through the adsorptive members 1 towards the center of the rotor 2.

At the desorbing section B, on the other hand, the solvent adsorbed to the members 1 is desorbed as a high temperature recycling air introduced via a recycling air passage 4 passes in the reverse direction through the adsorptive members 1 from the rotor center towards the outer peripheral portion of the rotor 2.

Namely, with a rotation of the rotor 2, the adsorption at the adsorbing section A and the desorption at the desorbing section B are effected simultaneously and continuously.

The adsorptive member 1 is made of a paper sheet material mixed with fibroid activated carbon or finely granular or powdery activated carbon. Each adsorptive member 1 has a rectangular parallelopiped configuration with a honeycomb structure, and the plurality of the members 1 are mounted on the rotor 2 with the communication directions of the honeycomb holes respectively corresponding to radial directions of the rotor 2.

Figure 3:
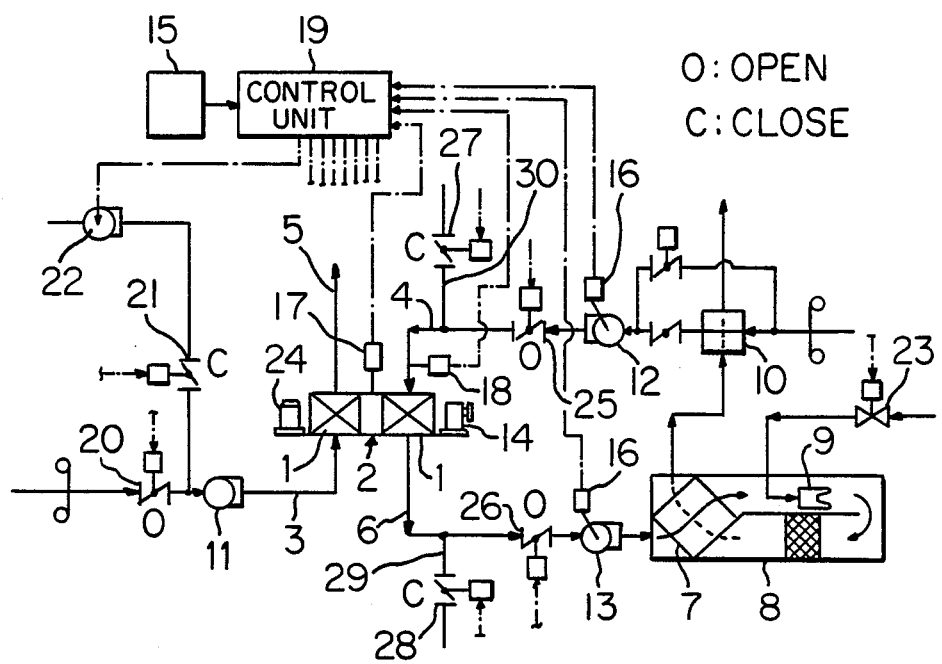

FIG. 3 shows a gas flow under a normal operating condition of the entire gas treating apparatus, in which the treatment-object gas (treated gas) cleaned, i.e. solvent-removed, at the adsorbing section A is exhausted out of the apparatus via a gas exhaust passage 5.

On the other hand, the recycling air after use for the desorption at the desorbing section B is fed via an air exhaust passage 6 and a first heat exchanger 7 into a combustion chamber 8 to have its solvent content burned by a burner 9 in this chamber 8.

Thereafter, this burned recycling air is effectively utilized for pre-heating of yet un-burned air in the first heat exchanger 7 and then for heating in a second heat exchanger 10 of un-used recycling air to be newly introduced to the desorbing section B. After these utilizations, the air is finally exhausted out of the entire system.

Reference numeral 11 denotes a fan for introducing the treatment-object gas into the adsorbing section A.

Numerals 12 and 13 denote further fans for feeding the high temperature recycling air to the desorbing section B and for feeding used, i.e. solvent-containing air to the combustion chamber 8.

Numeral 14 denotes an electric motor for rotating the rotor 2 at a predetermined slow rotational speed.

As one example of operational specifications of this gas treating apparatus, the rotational speed of the rotor 2 is 5 to 6 rph, the temperature of treatment-object gas to be fed into the adsorbing section A ranges between 25 and 35 degrees Celsius, the temperature of high temperature recycling air to be fed to the desorbing section B ranges between 100 and 150 degrees Celsius, the passing speed of the gas through the adsorptive members 1 at the adsorbing section A and that of the high temperature recycling air through the member 1 at the desorbing section B are approximately 2 m/s, respectively.

An abnormal temperature rise in the adsorptive members 1 on the rotor 2 may be caused by e.g. abnormal stop of the desorbing unit fans 12 and 13 or of the rotor 2 or by an abnormal temperature rise in the desorbing section B.

In order to find out exact causes of such abnormal temperature rise in the adsorptive members 1 associated with the above-listed troubles for example, the present inventors conducted many various experiments. The results reveal that such abnormal temperature rise in the adsorptive member is apt to occur if there exists only a negligible amount of air flow of approximately 0.4 cm/s at the recycling air temperature of 100 to 150 degrees Celsius. This is because the above-specified amount of air flow is just sufficient to provide the spontaneously-combustible portion with an amount of oxygen suitable for combustion without providing the same with any significant cooling effect. The combustible condition may vary depending on the kinds or types of employed adsorptive members and solvent. Further, an abnormal temperature rise may also occur with such amount of oxygen suitable for combustion even if there exists no air flow at all. These conditions are generally referred to herein as the zero-air-flow condition.

The inventors conducted further experiments for finding out the exact portion of the adsorptive members 1 where the abnormal temperature rise is most likely to occur. The results reveal the following facts. First, with an occurence of abnormal stop of the desorbing unit fan 12 and/or 13, this stops the flow of high temperature recycling air. With this trouble, a particular adsorptive member 1 currently positioned within the desorbing section B is subjected to the high-temperature-zero-air-flow condition since the rotor 2 is rotating at such slow speed as 5 to 6 rph. Second, with an occurrences of an abnormal stop of the rotor 2, at the vicinity of the desorbing section B, i.e. adjacent sealing portions C to be described later, the high temperature recycling air flow stagnates while the heat conduction via the hot recycling air continues. Accordingly, an adsorptive member 1 currently positioned within the above-described area is subjected to the high-temperature-zero-air-flow condition. In these trouble occurrences, the adsorptive member 1 positioned within or adjacent the desorbing section B is placed under a fire-inviting dangerous condition. Further, a portion of the adsorptive members 1 which is yet un-desorbed of its solvent content is also in such a dangerous condition. More particularly, on the activated carbon of the adsorptive member portion which is currently positioned within or adjacent the desorbing section B and which is yet un-desorbed of its solvent content, the adsorbed solvent causes an oxidation reaction. Then, as this reaction heat is accumulated, there occurs an abnormal temperature rise at this portion which eventually leads to a spontaneous combustion of the same. This portion of the adsorptive members 1 is referred herein to as "the spontaneously-combustible portion".

In view of the above-described problems, the present invention provides, as trouble detecting means for detecting an abnormal temperature rise in the adsorptive members 1 on the rotor 2, an electricity-failure detecting sensor 15 for detecting an electricity failure, a fan-stop detecting sensor 16 for detecting an abnormal stop of at least either of the desorbing unit fans 12 and 13, a rotor-stop detecting sensor 17 for detecting an abnormal stop of the rotor 2, and a temperature detecting sensor 18 for detecting a temperature of the desorbing section B.

The invention further provides a safety control unit 19 for automatically executing safety control schemes listed as (a), (b), (d) and (d) below based on the detections made by the above sensors 15, 16, 17 and 18.

Incidentally, in the respective safety control schemes (a), (b), (c) and (d) below, an operation (1) is effected with a first cooling air supply device, an operation (4) is with a second cooling air supply device, and an operation (3) is effected with an emergency evacuation device, respectively.

With operations of these devices executed in accordance with the control schemes specified below, it becomes possible to effectively evacuate the spontaneously-combustible portion from the high-temperature-zero-air-flow condition.

(a) when the electricity-failure detecting sensor 15 detects an electricity failure (see FIGS. 4(a) and 4(b), the adsorbing unit fan 11, desorbing unit fans 12 and 13 and the rotor driving electric motor 14 are all stopped; then, the following operations are carried out:

(1) a first damper 20 is closed and a second damper 21 is opened. Then, for purging and cooling the adsorbing section A, an emergency fan 22 for feeding an ambient air as the first cooling air is driven for a predetermined time period by an emergency power source. The air-feeding speed of this fan should preferrably range between 1/5 and 1/20 of the feeding speed of the treatment-object gas.

(2) a cutoff valve 23 is activated for shutting off fuel supply to the burner 9.

(3) a compression air motor 24 is energized for rotating the rotor 2 by a predetermined rotational angle at a speed faster than its normal rotational speed such that the adsorptive member currently positioned within or in the vicinity of the high temperature desorbing section B may evacuate to the adsorbing section A which is under a relatively lower temperature.

(4) a third damper 25 and a fourth damper 26 are closed and a fifth damper 27 and a sixth damper 28 are opened, thereby stopping the supply of the high temperature recycling air to the desorbing section B. Then, by a natural ventilation associated with a drafting effect of the high temperature air at the desorbing section B, a cooling ambient air as the second cooling air is fed to the desorbing section B via the air passages 29, 6, 4 and 30.

(b) when the fan-stop detecting sensor 16 detects an abnormal stop of either or both of the desorbing unit fans 12 and 13 while the electricity-failure detecting sensor 15 detects no electricity failure (see FIGS. 5(a) and 5(b)); then, the following operations are carried out:

(1) the first damper 20 is closed and the second damper 21 is opened. Then, the adsorbing unit fan 11 is continuously driven for a predetermined time period for supplying the ambient air for purging and cooling the adsorbing section A.

(2) the cutoff valve 23 is activated for shutting off fuel supply to the burner 9.

(3) after the rotor driving electric motor 14 is deenergized for stopping the normal rotation of the rotor 2, the compression air motor 24 is energized for evacuating the adsorptive member 1 currently positioned within and adjacent the desorbing section B to the lower temperature adsorbing section A in the manner described in the operation (3) of the foregoing safety control scheme (a).

(4) the third damper 25 and the fourth damper 26 are closed and the fifth damper 27 and the sixth damper 28 are opened, thereby providing the desorbing section B with the cooling ambient air through the natural ventilation by the drafting effect in the same manner as described in the operation (4) of the foregoing safety control scheme (a).

(c) when the rotor-stop detecting sensor 17 detects an abnormal stop of the rotor 2 while the electricity-failure detecting sensor detects no electricity failure (see FIGS. 6(a) and 6(b)); then, the following operations are effected:

(1) the first damper 20 is closed and the second damper 21 is opened. Then, the adsorbing unit fan 11 is continuously driven for a predetermined time period for supplying the ambient air to purge and cool the adsorbing section A.

(2) the cutoff valve 23 is activated for shutting off fuel supply to the burner 9.

(3) the compression air motor 24 is energized for evacuating the adsorptive member 1 currently positioned within and adjacent the desorbing section B to the lower temperature adsorbing section A in the manner described in the operation (3) of the foregoing safety control scheme (a).

(4) of the desorbing unit fan pair 12 and 13, the delivery fan 12 for feeding the recycling air to the desorbing section B is stopped and the third damper 25 is closed. Further, the fifth damper 27 is opened and the other suction fan 13 of the desorbing unit fan pair 12 and 13 is driven for a predetermined time period, such that the high-temperature recycling air supply to the desorbing section B is stopped and at the same time cooling ambient air is forcibly fed to the section B by the fan 13 through the air passages 30, 4 and 6.

(d) when the temperature detecting sensor 18 detects a temperature higher than a predetermined temperature, the rotor driving motor 14 is deenergized for stopping the normal rotation of the rotor 2. Then, the same operational procedures as specified in the foregoing control scheme (c) are carried out.

Incidentally, in all of the above control schemes (a) through (d), the compression air motor 24 is energized for driving the rotor 2 at a speed higher than the normal rotational speed of the same in order to evacuate the adsorptive member 1 positioned within or adjacent the desorbing section B to the adsorbing section A.

Also, the rotational angle of the emergency rotor rotation effected by the compression air motor 24 is so predetermined as will suffice to effectively evacuate to the adsorbing section A the adsorptive member 1 currently positioned at the sealing portions C where sealing walls 31 (see FIG. 2) are formed for sealing communication between the desorbing section B and the adsorbing section A and also the adsorptive member 1 currently positioned within the desorbing section B. With this pre-setting arrangement of the rotor rotation angle, it becomes possible to further reliably prevent an abnormal temperature rise in the adsorptive member 1 positioned within the desorbing section B under the highest temperature and in the other adsorptive members 1 positioned at the sealing portions C under the second highest temperature.

Alternate embodiments of the present invention will be described next.

Figure 7:
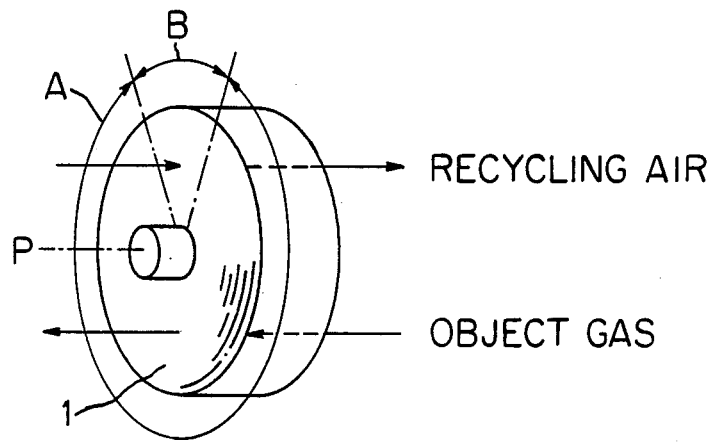
FIG. 7 is a perspective view of a rotor relating to an alternate embodiment of the invention.

(i) The adsorptive members 1 are mounted on the rotor in the radial arrangement in the previous embodiment. In place of this, as shown in FIG. 7, a single adsorptive member 1 formed like a circular disk may be mounted on the rotor 2. Further, this conveying device for conveying the adsorptive members 1 to the desorbing section B via the adsorbing section A is not limited to the rotor.

(ii) The cooling air to be fed to the desorbing section B for the purpose of preventing abnormal temperature rise in the adsorptive members 1 is not limited to the ambient air employed in the previous embodiment. It is to be noted here, however, that the cooling air should be of a temperature lower than one half of the temperature of the high-temperature recycling air.

It is also preferred that the above cooling air be fed to the adsorptive members at a rate no less than 20 cm/s.

Further, it is also conceivable to mix cooling water mist into the cooling air for enhancing the cooling effect.

(iii) In the control schemes of the previous embodiment, the cooling air is automatically fed to the desorbing section B for preventing an abnormal temperature rise in the adsorptive members 1. Also, for the same purpose, the conveying device (i.e. the rotor 2) is automatically driven at a speed higher than its normal operating speed for evacuating the adsorptive members 1 located within or adjacent to the desorbing section B to the adsorbing section A. It is possible to carry out only either of these operations or both of the same as in the previous embodiment.

(iv) When the conveying device (i.e. the rotor 2) is driven at a speed higher than its normal operating speed for evacuating the adsorptive members 1 located within or adjacent the desorbing section B to the adsorbing section A, the rotational direction of the rotor for this emergency evacuation may be either the same as or opposite to its normal conveying direction. Incidentally, it has been experimentally confirmed that even with the same rotational direction of the rotor there occurs no abnormal temperature rise in an adsorptive member which has been newly moved into the desorbing section B because this adsorptive member is still under a relatively lower temperature and also because the supply of the high-temperature recycling air has been already stopped.

(v) If an emergency power source is provided for the suction fan 13 for the desorbing section B, the cooling effect may be further enhanced since the cooling ambient air may be forcibly fed to the desorbing section B even in the case of a power failure described in connection with control scheme (a).

(vi) One of the fan-stop detecting sensor 16, rotor-stop detecting sensor 17 and the temperature detecting sensor 18 may co-act as the power-failure detecting sensor 15 thereby eliminating the same.

Although reference numerals and marks are provided to the appended claims for the purpose of facilitating reference to the accompanying drawings, these are not to limit the scope of the invention to the constructions illustrated in these drawings.

What is claimed is:

1. A gas treating apparatus comprising:
   an adsorptive member 1 having a material capable of adsorbing a solvent contained in the object gas and capable also of desorbing the adsorbed solvent through a high-temperature recycling air;
   a conveying device for holding said adsorptive member 1 and conveying the same from an adsorbing section A where the treatment-object gas is introduced to a desorbing section B;
   a recycling gas supplying device 12, 13 for supplying the high-temperature recycling air for solvent desorption to said adsorptive member 1 currently positioned to said desorbing section B;
   trouble detecting means for detecting an abnormality in the gas treating apparatus; and
   safety means for evacuating a portion of said adsorptive member 1 currently located within and adjacent said desorbing section B and having solvent content thereof yet un-desorbed from a high-temperature-zero-air-flow condition based on a detection of said detecting means.

2. A gas treating apparatus as defined in claim 1, wherein said safety means includes;
   an emergency evacuation device 24 for evacuating said portion of the adsorptive member 1 to said adsorbing section A by activating said conveying device at a speed faster than a normal conveying speed thereof, and/or
   a second cooling air supply device for supplying a second cooling air to said desorbing section B.

3. A gas treating apparatus as defined in claim 2, wherein said trouble detecting means includes recycling-air-stop detecting sensors 15 and 16 for detecting abnormal stop of said recycling air supply devices 12 and 13 respectively.

4. A gas treating apparatus as defined in claim 3, wherein said second cooling air supply device supplies the second cooling air through natural ventilation by a drafting effect of the high-temperature air at said desorbing section B.

5. A gas treating apparatus as defined in claim 2, wherein said safety means also stops supply of the recycling air based on the detection of said trouble detecting means, and said trouble detecting means includes a conveying-device-stop detecting sensor 17 for detecting an abnormal stop of said conveying device.

6. A gas treating apparatus as defined in claim 2, wherein said safety means also stops supply of the recycling air based on the detection of said trouble detecting means, and said trouble detecting means includes a temperature detecting sensor 18 for detecting for a temperature of said desorbing section B higher than a predetermined temperature.

7. A gas treating apparatus as defined in claim 5 or 6, wherein said second cooling air supply device is a fan 13 for forcibly supplying the second cooling air to said desorbing section B.

8. A gas treating apparatus as defined in claim 5 or 6, wherein said second cooling air supply device includes;
   a fan 13 for forcibly supplying the second cooling air to said desorbing section B, and
   a cooling water mist mixing device for mixing cooling water mist into said second cooling air based on the detection of said trouble detecting means.

9. A gas treating apparatus as defined in claim 2, wherein said conveying device comprises a rotor 2 axially mounting thereon a plurality of said adsorptive members 1 in a radial arrangement, with said desorbing section B being disposed in a predetermined rotational phase of said rotor 2 and with said adsorbing section A being disposed in a predetermined differential rotational phase of the same.

10. A gas treating apparatus as defined in claim 2, wherein said emergency evacuation device evacuates said portions of the adsorptive member 1 by driving said conveying device in a direction opposite to a normal conveying direction of the same.

11. A gas treating apparatus as defined in claim 10, wherein said portions of the adsorptive member 1 evacuated by said emergency evacuation device includes a portion located within sealing portions C adjacent said desorbing section B.

12. A gas treating apparatus as defined in claim 1, wherein said safety means includes;
   a first cooling air supply device for supplying a first cooling air to said adsorbing section A,
   an emergency evacuation device 24 for evacuating said portion of the adsorptive member 1 to said adsorbing section A by activating said conveying device at a speed faster than a normal conveying speed thereof, and/or
   a second cooling air supply device for supplying a second cooling air to said desorbing section B.

* * * * *

UNITED STATES PATENT AND TRADEMARK OFFICE
CERTIFICATE OF CORRECTION

PATENT NO. : 4,895,580

DATED : January 23, 1990

INVENTOR(S) : Koji Morioka, Hiromasa Ogata and Susumu Ohmori

It is certified that error appears in the above-identified patent and that said Letters Patent is hereby corrected as shown below:

Title page:

Under References Cited U.S. PATENT DOCUMENTS insert
--3,367,404 2/1968 Johnson et al.
3,361,193 1/1968 Kritzler--.
and
Under FOREIGN PATENT DOCUMENTS insert
--60-34991 10/1985 Japan--.

Column 4 Line 16 "occurrences" should read --occurrence--.

Column 4 Line 53 "(d)" (first occurrence) should read --(c)--.

Column 4 Line 67 after "(b)" insert --)--.

Column 7 Line 40 "to" should read --in--.

Claim 2 Line 46 Column 8 "differential" should read --different--.

Signed and Sealed this

Eighth Day of January, 1991

*Attest:*

HARRY F. MANBECK, JR.

*Attesting Officer*     *Commissioner of Patents and Trademarks*